(No Model.)

E. H. SEDDON.
PNEUMATIC WHEEL TIRE.

No. 523,947. Patented July 31, 1894.

Witnesses:
Wm. A. Coursen Jr.
S. L. Wood.

Inventor.
Edward H. Seddon.
By his Attorney
Edward P. Thompson

UNITED STATES PATENT OFFICE.

EDWARD HENRY SEDDON, OF SALE, ENGLAND.

PNEUMATIC WHEEL-TIRE.

SPECIFICATION forming part of Letters Patent No. 523,947, dated July 31, 1894.

Application filed October 25, 1893. Serial No. 489,131. (No model.)

*To all whom it may concern:*

Be it known that I, EDWARD HENRY SEDDON, a subject of the Queen of Great Britain, residing at Sale, in the county of Chester and Kingdom of Great Britain, have invented certain new and useful Improvements in Inflated Wheel-Tires, of which the following is a specification.

My invention relates to that kind of inflated tire in which an air-tube is inclosed in a horse shoe shaped cover attached to the rim by means of wires passed through tubes formed on each edge of the said cover similarly as described in my United States Patent No. 433,798 and consists in an improved construction of fastening for the ends of the wire the object being to facilitate the detachment and attachment of the cover.

Figure 1:
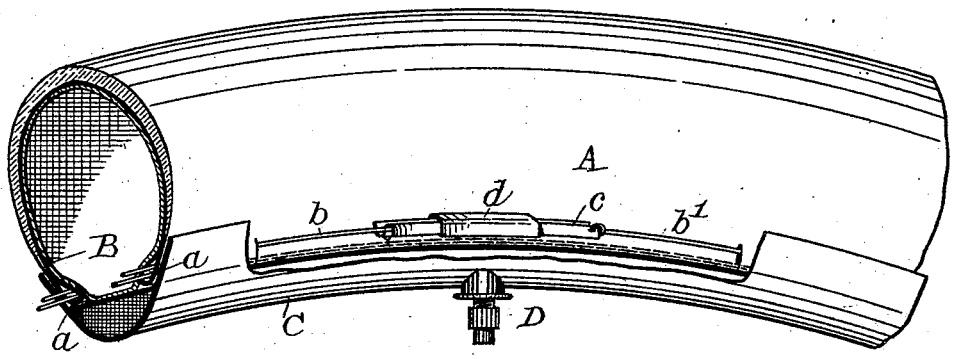
Figure 2:
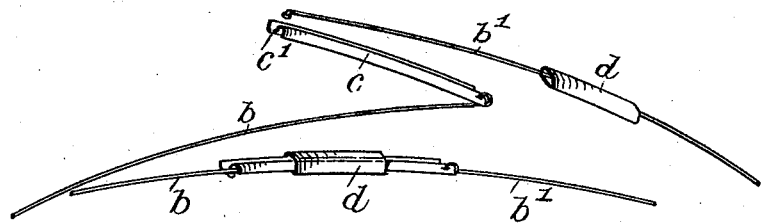

Referring to the accompanying drawings, Figure 1 shows a perspective partly sectioned side view of part of a tire and rim or felly with my improvements applied thereto and Fig. 2 a view of the wires and fastening detached and in the fastened and unfastened state.

A is the cover formed as usual of india rubber with a canvas lining turned over the edges so as to form tubes $a\ a$; B is the air tube, C the rim, D the valve for inflating the air tube.

In carrying my invention into effect, I make the wire or band of such length that when it is tightened the ends $b\ b'$ overlap each other by the length of the stretcher $c$. This stretcher is formed of a strip of sheet metal bent into the shape of an S in cross section. It is hinged to the wire $b$ by means of a hole at one end through which the wire is curled, and at the other end formed with a notch $c'$ in the other groove. The wire end $b'$ is preferably bent down at the end and has a head or button formed thereon. When the stretcher $c$ is turned up, the end of the wire $b'$ can be hooked into the notch $c'$. Equivalent means of attachment may be substituted. If this end of the wire is then pressed down, the wire or band is tightened or stretched with gradually increased force, the combination acting similarly to a toggle joint, until the wire $b$ has laid itself into the groove on the under side of the stretcher $c$ and the wire $b'$ into the groove on the upper side, when the coupling becomes locked. In order to further secure it, a sleeve $d$ may be put on the wire $b'$ and after the stretcher $c$ has been depressed down as aforesaid, pushed over the same and the wire ends. This coupling occupies little space and is easily opened and closed again.

What I claim as my invention, and desire to secure by Letters Patent, is—

A coupling device for the ends of a wire attaching a tire cover to a rim, said device consisting of a stretcher ($c$) of S shaped section hinged to the wire end ($b$) and having the other wire end ($b'$) hooked upon its other end and in such a manner that when said stretcher is pressed down upon the wire end ($b$) this lies in the bottom groove and the other wire end ($b'$) in the top groove of said stretcher, substantially as described and illustrated.

In testimony whereof I have hereunto affixed my signature in presence of two witnesses.

EDWARD HENRY SEDDON.

Witnesses:
CARL BOLLÈ,
REDLEY JAMES URQUHART.